UNITED STATES PATENT OFFICE.

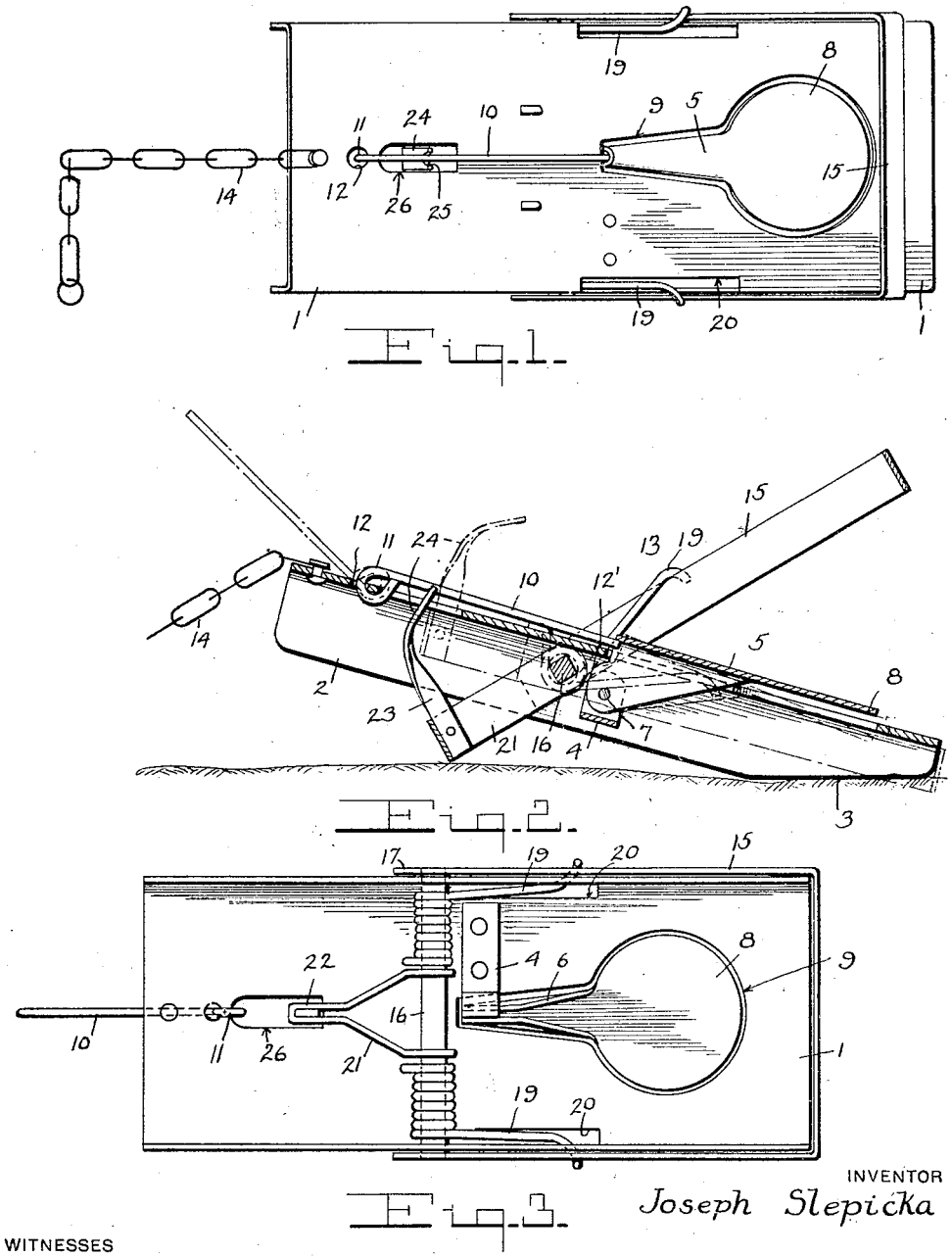

JOSEPH SLEPIČKA, OF TOBIAS, NEBRASKA.

ANIMAL-TRAP.

1,284,483.  Specification of Letters Patent.  Patented Nov. 12, 1918.

Application filed April 22, 1918. Serial No. 230,128.

*To all whom it may concern:*

Be it known that I, JOSEPH SLEPIČKA, a citizen of the United States, residing at Tobias, in the county of Saline and State of Nebraska, have invented certain new and useful Improvements in Animal-Traps, of which the following is a specification.

This invention relates to animal traps and has for its object the production of a simple and efficient animal trap which is especially designed for the purpose of catching small animals such as squirrels and gophers.

Another object of this invention is the production of a simple and efficient means for tripping the spring jaw of the trap as soon as the tripping plate of the trap is forced downwardly.

With these and other objects in view this invention consists of certain novel constructions, combinations and arrangements of parts as will be hereinafter fully described and claimed.

In the drawings:

Figure 1 is a top plan view of the trap,

Fig. 2 is a central longitudinal section therethrough,

Fig. 3 is a bottom plan view of the trap.

By referring to the drawings, it will be seen that 1 designates the base of the trap which is preferably formed of sheet metal and is provided with a pair of downwardly extending side flanges 2. These flanges 2 are provided with upwardly inclined under edges 3 as shown in Fig. 2 of the drawings, for the purpose of permitting the base 1 to normally rest at an angle with respect to the ground upon which the device is resting, when the trap is in a set position.

A hanger bracket 4 is secured to the under face of the base 1 as shown in Figs. 2 and 3 of the drawings, and a tripping plate 5 is pivotally mounted upon the hanger bracket 4 by having its downwardly folded flange portions 6 pivotally mounted upon the hanger bracket 4 by means of a pivot pin 7. The entire base 1, as well as the tripping plate 5 is preferably formed of sheet metal which is capable of being easily bent, in this way greatly cheapening the construction of the device and also rendering the same easy to manufacture. The tripping plate 5 is provided with a substantially semicircular tripping tread portion 8 as shown in Figs. 1 and 3 of the drawings, and this tripping plate 5 works within a cut out portion or notch 9 formed in the base or body 1. The tripping plate 5 is preferably mounted upon the pivot pin 7 in such a manner as to extend above the upper face of the base 1, when the tripping plate 5 is placed in an operative position, in this way permitting the tripping plate 5 to be easily engaged by means of the latching link 10.

The latching link 10 is secured to the base 1 by means of eye portions 11, which eye portions 11 extend through an aperture 12 formed in the base 1 near the rear end of the trap. This link 10 is adapted to have its forward end 12′ extend under the rolled portions 13 of the tripping plate 5 as shown in Fig. 2 of the drawings. The rolled portion 13 of the tripping plate 5 is formed by folding the flanges 6 downwardly for the purpose of permitting an efficient means for pivotally securing the tripping plate 5 to the hanger bracket 4.

The base 1 may be secured or anchored in any suitable or desired manner to a simple connecting means through the medium of the connecting chain 14 as shown in Figs. 1 and 2 of the drawings. A spring closure jaw 15 is carried upon a transversely extending squared shaft 16 as shown clearly in Figs. 2 and 3 of the drawings and this shaft 16 is mounted or journaled upon the flanges 2 so as to easily rotate thereon. The jaw 15 is preferably U-shaped in form and has its inner end 17 firmly connected or fitted over the squared end of the shaft 16. A pair of coil springs 18 are wound around the respective ends of the shaft 16 and these springs 18 are secured at their inner ends to the base 1 and have their outer ends 19 extending through the slots 20 formed in the base 1 and overhanging the upper edges of the side arms of the spring jaws 15 as shown clearly in Figs. 2 and 3 of the drawings. By considering the drawings, it will be seen that these springs 18 will normally exert a downward pressure upon the jaw 15 for forcing the same firmly upon the outer end of the casing 1, or to a closed position.

A trigger supporting yoke 21 is secured firmly to the supporting shaft 16 and this yoke 21 is provided with a narrowed outer end 22, the outer end 22 supporting a trigger finger 23. This trigger finger 23 is provided with an angularly extending end 24, the angularly extending end 24 being provided with a notch 25 for the purpose of receiving the latching link 10. This trigger 23 is adapted to work through a slot 26 formed in the base 1 as shown in Fig. 1 for the purpose of engaging the link 10 and holding the link 10 in firm engagement with the tripping plate 5 as shown in Fig. 2.

The operation of the device is as follows:

The jaw 15 is swung to the position shown in Fig. 2 and the latching link 10 is swung into the position shown in Fig. 2 for the purpose of overhanging the outer end of the trigger end 23, the link 10 fitting within the notch 25 of the trigger 23. This link 10 then extends under the inner end or the rolled portion 13 of the tripping plate 5, in this way holding the tripping plate 5 in a proper position for supporting a suitable bait which may be placed thereon. As soon as an animal steps or treads upon the tripping plate 5, the tripping plate 5 or the rolled portion thereof will be disengaged from the inner end of the link 10. As soon as the link 10 is released from the tripping plate 5, the coil spring 18 carried by the shaft 16 will cause the shaft 16 to be rotated, thereby throwing the jaw 15 firmly upon or over the outer end of the base 1 and trapping an animal which has stepped over or upon the tripping plate 5. This downward spring of the jaw 15 will be permitted due to the fact that the link 10 will be released at its outer end, thereby permitting the trigger 23 to assume the position shown in dotted lines in Fig. 2 of the drawings, the link 10 being also thrown to the position shown in dotted lines.

From the foregoing description, it will be seen that a very simple and efficient means has been produced in the nature of an animal trap which may be very cheaply constructed and which will be very efficient in operation, the same automatically swinging to a closed or trapped position as soon as an animal steps upon the tripping plate 5.

What is claimed is:

1. An animal trap of the class described comprising a base formed from sheet metal, said base provided with a pair of side depending flanges, said flanges provided with an upwardly inclined lower edge upon the forward ends thereof, a jaw hingedly secured to said base, a trigger supporting arm connected to said jaw and adapted to extend downwardly at an angle from said base for supporting said base at an angle upon the ground, means for yieldably forcing said jaw to a closed position, and trigger means for holding said jaw in an open position.

2. A trap of the class described comprising a base, a tripping plate carried thereby, a hinged bracket secured to said base, a set tripping plate provided with a reduced shank, said shank provided with a pair of depending integral side flanges, means extending through said flanges and pivotally securing the same to said hanger bracket, said base provided with an aperture formed therein, said tripping plate extending through said aperture, the swinging jaw carried by said base, and trigger means carried by said base and coöperating with said swinging jaw and adapted to be engaged by said tripping plate for holding said swinging jaw in an open position.

3. A trap of the class described comprising a base, a jaw pivotally mounted upon said base and provided with means projecting below said base and adapted to engage the ground and hold one end of said base above the ground when said jaw is in an open position, a tripping means, a trigger carried by said base, and means coöperating with said jaw and engaging said trigger whereby said jaw will be held in an open position when said trigger engages said last mentioned means.

4. A trap of the class described comprising a base, a tripping plate carried thereby, a jaw mounted upon said base, a shaft supporting said jaw, spring means carried by said shaft and engaging said jaw for normally swinging the same to a closed position upon said base, a yoke secured to said shaft and adapted to project below said frame and constituting a support for elevating one end of said base when said jaw is swung to an open position, a trigger member extending upwardly from said yoke, a locking link mounted upon said base and adapted to engage the upper end of said trigger member for holding said jaw in an open position, and said tripping plate provided with means for engaging one end of said base for releasably holding said link in an operative position.

In testimony whereof I affix my signature in presence of two witnesses.

JOSEPH SLEPIČKA.

Witnesses:
F. H. ALLEN,
A. H. MAXSON.

Copies of this patent may be obtained for five cents each, by addressing the "Commissioner of Patents, Washington, D. C."